(12) United States Patent
Suki

(10) Patent No.: US 11,880,548 B2
(45) Date of Patent: Jan. 23, 2024

(54) IMAGE PROCESSING APPARATUS AND IMAGE PROCESSING METHOD

(71) Applicant: Sony Interactive Entertainment Inc., Tokyo (JP)

(72) Inventor: Yasuyuki Suki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/792,204

(22) PCT Filed: Sep. 28, 2020

(86) PCT No.: PCT/JP2020/036726
§ 371 (c)(1),
(2) Date: Jul. 12, 2022

(87) PCT Pub. No.: WO2021/152911
PCT Pub. Date: Aug. 5, 2021

(65) Prior Publication Data
US 2023/0050265 A1 Feb. 16, 2023

(30) Foreign Application Priority Data
Jan. 28, 2020 (JP) ................ 2020-011904

(51) Int. Cl.
*G06F 3/0482* (2013.01)
*G06F 3/04812* (2022.01)
*G06F 3/04845* (2022.01)

(52) U.S. Cl.
CPC ........ *G06F 3/0482* (2013.01); *G06F 3/04845* (2013.01); *G06F 3/04812* (2013.01)

(58) Field of Classification Search
CPC .................. G06F 3/0482; G06F 3/04845
See application file for complete search history.

(56) References Cited

U.S. PATENT DOCUMENTS 9,021,386 B1 * 4/2015 Rasmussen ........... G06F 3/0485
715/785
2008/0147664 A1 * 6/2008 Fujiwara ............. G06F 3/04892
(Continued)

FOREIGN PATENT DOCUMENTS

| JP | 1040018 A | 2/1998 |
|---|---|---|
| JP | 2001155188 A | 6/2001 |
| JP | 2012073995 A | 4/2012 |

OTHER PUBLICATIONS

International Search Report for corresponding PCT Application No. PCT/JP2020/036726, 4 pages, dated Nov. 10, 2020.

*Primary Examiner* — Beau D Spratt
(74) *Attorney, Agent, or Firm* — Matthew B. Dernier, Esq.

(57) ABSTRACT

An arrangement section arranges a plurality of display elements including a first display element and a second display element. A reception section receives an operation for selecting a display element. A display processing section displays the selected display element in such a predetermined manner as to indicate that the display element is selected. When the reception section receives an operation for selecting the second display element while the first display element is in the selected state, the display processing section performs presentation display indicating that a state in which the first display element is selected is to be changed to a state in which the second display element is selected, and then displays the second display element in a predetermined manner.

6 Claims, 9 Drawing Sheets

(56) References Cited

U.S. PATENT DOCUMENTS

| | | | |
|---|---|---|---|
| 2011/0109544 A1* | 5/2011 | Kitagawa | G01C 21/3664 345/157 |
| 2011/0161867 A1* | 6/2011 | Tomita | H04N 1/00514 715/835 |
| 2013/0311920 A1* | 11/2013 | Koo | G06F 3/04883 715/765 |
| 2014/0282258 A1* | 9/2014 | Treskunov | G06F 3/0486 715/764 |

* cited by examiner

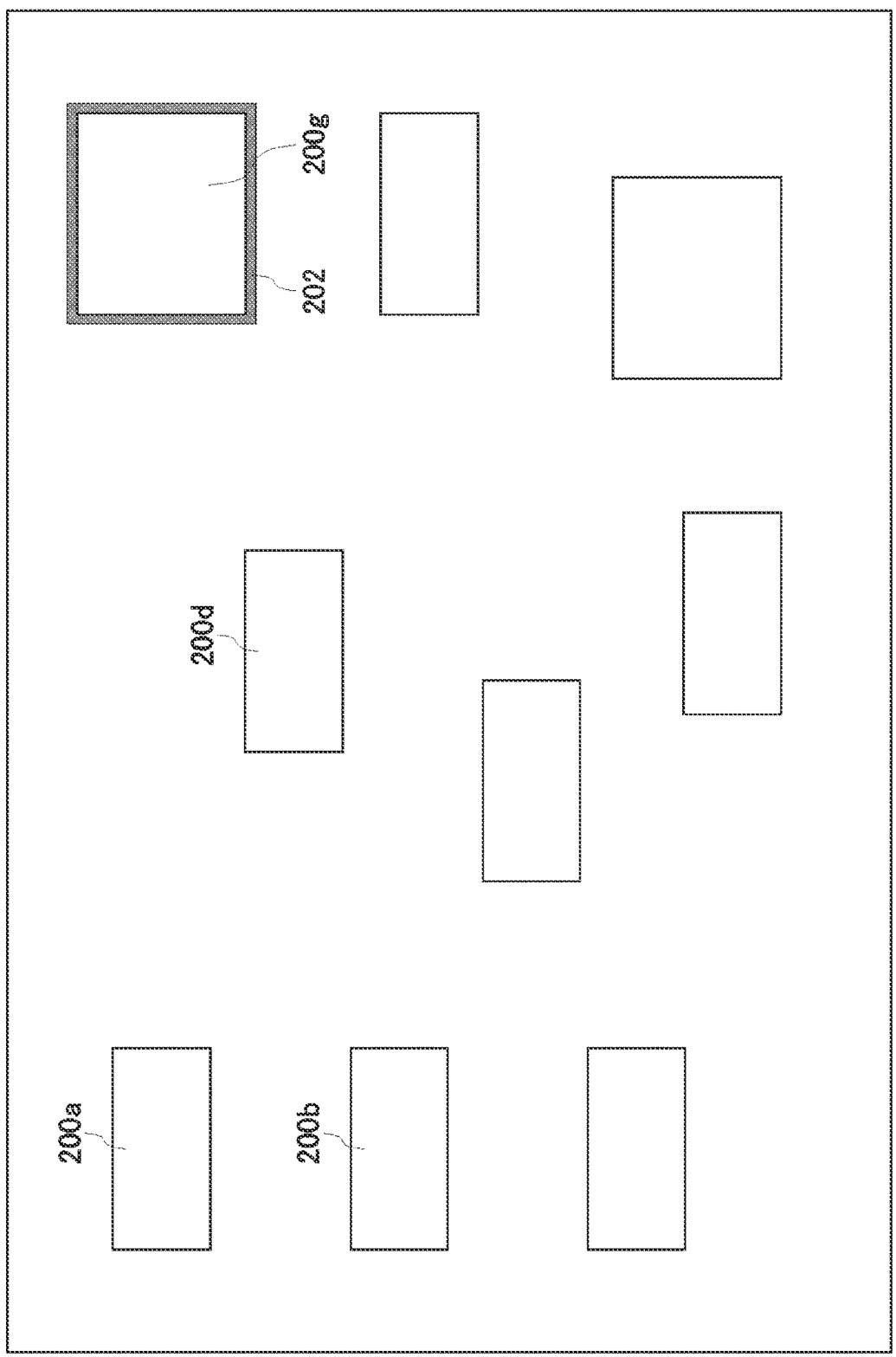
F I G. 5

IMAGE PROCESSING APPARATUS AND IMAGE PROCESSING METHOD

TECHNICAL FIELD

The present invention relates to a technology for displaying a plurality of display elements on a screen.

BACKGROUND ART

An OS (Operating System) uses an icon-based GUI (Graphical User Interface) to present information to a user. When the user selects a desired icon from a menu image in which a plurality of icons are arranged, the selected icon is displayed in a manner different from that in which the other icons are displayed; for example, the selected icon is enclosed by a focus frame. When the user performs a determination operation on the selected icon, the operating system executes a function associated with the icon.

SUMMARY

Technical Problem

In a case where a user selects an icon by operating arrow keys, the user has difficulty in predicting which icon position the focus frame is to move to unless the plurality of icons are regularly arranged in the vertical and horizontal directions, and the user may possibly lose sight of the focus frame. Thus, it is desired to develop a technology that allows a user to easily recognize the icon selected by the user.

Solution to Problem

To solve the problem described above, an image processing apparatus according to an aspect of the present invention includes an arrangement section that arranges a plurality of display elements including a first display element and a second display element, a reception section that receives an operation for selecting a display element, and a display processing section that displays the selected display element in such a predetermined manner as to indicate that the display element is selected. When the reception section receives an operation for selecting the second display element while the first display element is in the selected state, the display processing section performs presentation display indicating that a state in which the first display element is selected is to be changed to a state in which the second display element is selected, and then displays the second display element in a predetermined manner.

An image processing method according to another aspect of the present invention includes a step of arranging a plurality of display elements including a first display element and a second display element, a step of receiving an operation for selecting the second display element while the first display element is in a selected state, a step of performing presentation display indicating that a state in which the first display element is selected is to be changed to a state in which the second display element is selected, and a step of displaying the selected second display element in a predetermined manner.

Note that any combination of the components described above and expressions obtained by exchanging the expressions of the present invention among a method, an apparatus, a system, a recording medium, a computer program, and the like are also effective as aspects of the present invention.

BRIEF DESCRIPTION OF DRAWINGS

FIG. 5 is a diagram depicting an example of the menu image in which a focus frame has moved.

DESCRIPTION OF EMBODIMENT

Figure 1:
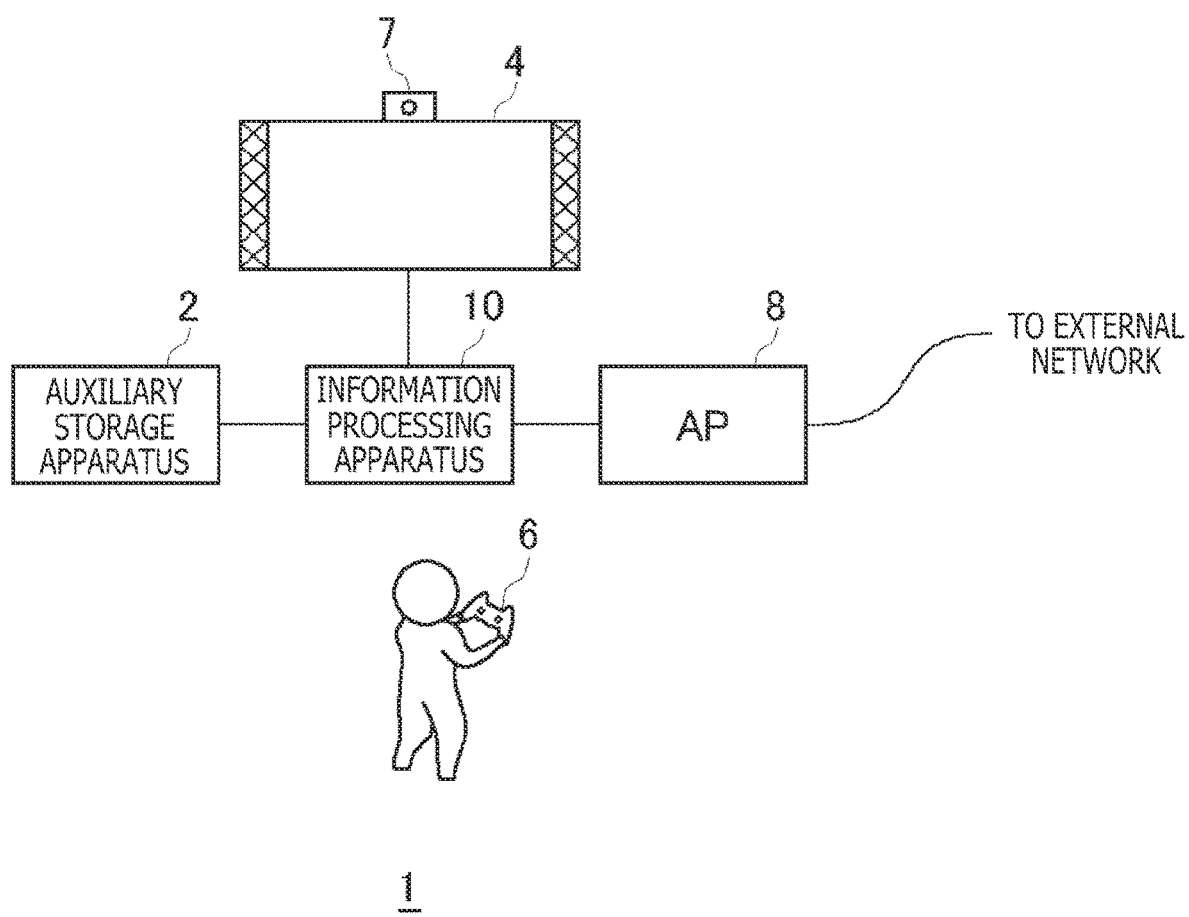
FIG. 1 is a diagram depicting an information processing system according to an embodiment.

FIG. 1 is an information processing system 1 according to an embodiment of the present invention. The information processing system 1 includes an auxiliary storage apparatus 2, an output apparatus 4, an input apparatus 6, a camera 7, and an information processing apparatus 10. The information processing apparatus 10 may be connected to an external network via an AP (Access Point) 8. The external network connects to a content server distributing content such as game software, and the information processing apparatus 10 can download the content from the content server via the AP 8. The information processing apparatus 10 according to the embodiment operates as an information processing apparatus which causes the output apparatus 4 to display a plurality of display elements such as icons.

The input apparatus 6 has wireless or wired connection to the information processing apparatus 10. The input apparatus 6 receives operation input from a user and supplies operation information to the information processing apparatus 10. The information processing apparatus 10 according to the embodiment is a game apparatus which executes game programs, and the input apparatus 6 may be equipment such as a game controller which supplies, to the information processing apparatus 10, information regarding an operation performed by the user. The information processing apparatus 10 applies the operation information received from the input apparatus 6, to processing executed by the OS and processing of the game program, and causes the output apparatus 4 to output processing results. Note that the information processing apparatus 10 may include a function of executing applications other than games, for example, a function of reproducing moving images of a movie or the like.

The input apparatus 6 according to the embodiment includes an input section having, for example, a plurality of operation pushbuttons and direction operators for specifying directions. In the embodiment, the direction operators are used in a menu image to move a focus frame that encloses an icon. The direction operators include a plurality of arrow keys and an analog stick that can be tilted in various directions, and the plurality of arrow keys may include an up arrow key, a down arrow key, a right arrow key, and a left arrow key.

The auxiliary storage apparatus 2 is a storage such as an HDD (Hard Disk Drive) or an SSD (Solid State Drive), and may be a built-in storage apparatus or an external storage apparatus connected to the information processing apparatus 10 by a USB (Universal Serial Bus) or the like. The output apparatus 4 may be a television including a display that outputs images and a speaker that outputs sound, or may be a head-mounted display. The camera 7 captures images of the space in which the user is present.

Figure 2:
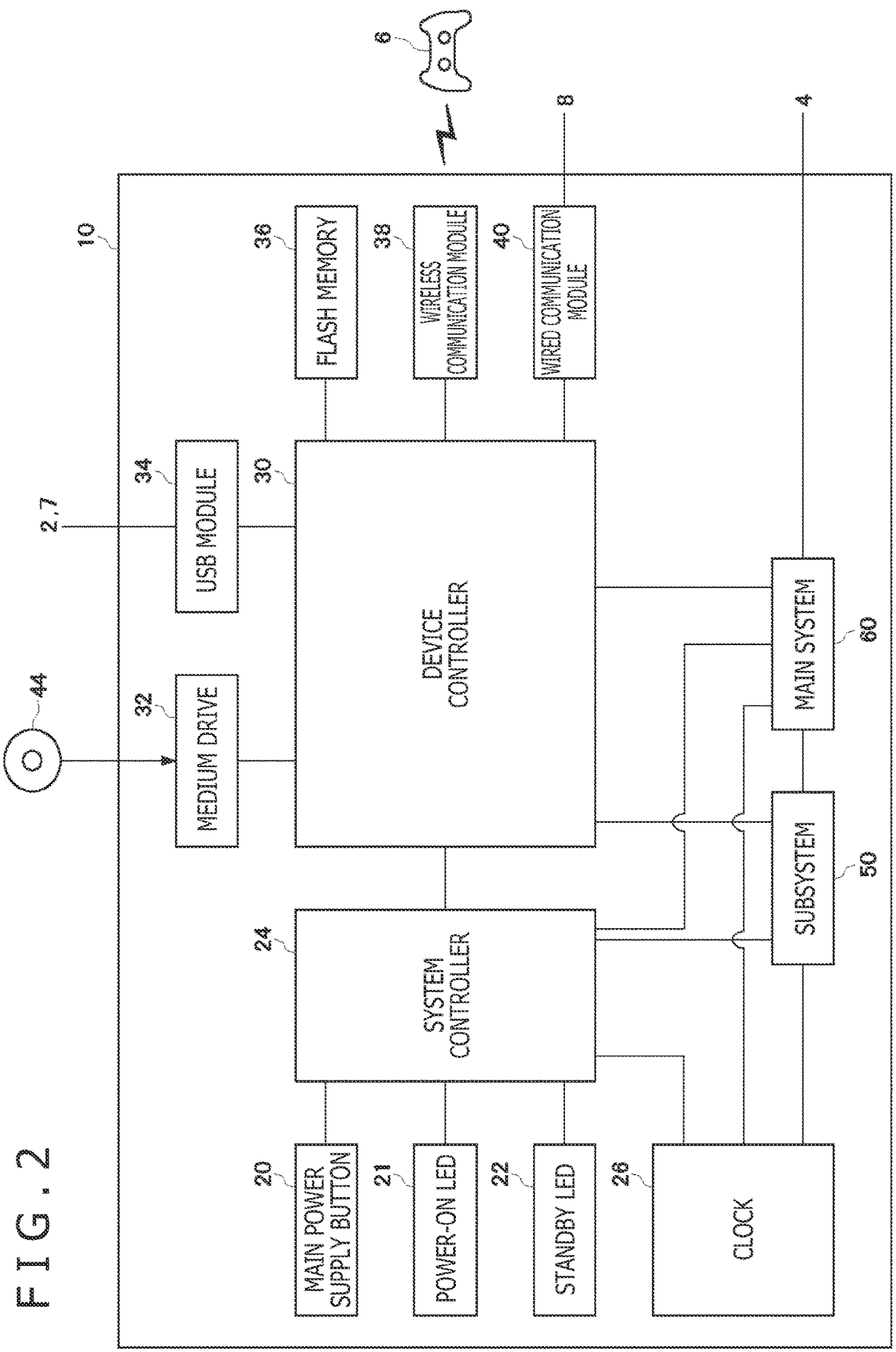
FIG. 2 is a diagram depicting a hardware configuration of an information processing apparatus.

FIG. 2 depicts a hardware configuration of the information processing apparatus 10. The information processing apparatus 10 includes a main power supply button 20, a power-on LED (Light Emitting Diode) 21, a standby LED 22, a system controller 24, a clock 26, a device controller 30, a medium drive 32, a USB module 34, a flash memory 36, a wireless communication module 38, a wired communication module 40, a subsystem 50, and a main system 60.

The main system 60 includes a main CPU (Central Processing Unit), a memory used as a main storage device, a memory controller, a GPU (Graphics Processing Unit), and the like. The GPU is mainly used for arithmetic processing for game programs. These functions may be configured as a system on a chip and formed on one chip. The main CPU has a function of executing game programs recorded in the auxiliary storage apparatus 2 or a ROM (Read-Only Memory) medium 44.

The subsystem 50 includes a sub-CPU, a memory used as a main storage device, a memory controller, and the like, but does not include a GPU and the function of executing the game programs. The sub-CPU includes fewer circuit gates than the main CPU, and has less operation consumed power than the main CPU. The sub-CPU operates even while the main CPU is in a standby state, and the processing functions of the sub-CPU are limited to keep power consumption low.

The main power supply button 20 is an input section to which operation input is provided by the user, and is disposed on a front surface of a housing of the information processing apparatus 10. The main power supply button 20 is operated to turn on or off power supply to the main system 60 of the information processing apparatus 10. The power-on LED 21 emits light when the main power supply button 20 is turned on, and the standby LED 22 emits light when the main power supply button 20 is turned off.

The system controller 24 detects that the main power supply button 20 is depressed by the user. When the main power supply button 20 is depressed while the main power supply is in an off-state, the system controller 24 acquires the depression operation as an "on-instruction." On the other hand, when the main power supply button 20 is depressed while the main power supply is in an on-state, the system controller 24 acquires the depression operation as an "off-instruction."

The clock 26 is a real-time clock that generates and supplies the current date and time information to the system controller 24 or to the subsystem 50 and the main system 60. The device controller 30 is configured as an LSI (Large-Scale Integrated Circuit) that passes information between devices like a south bridge. As depicted in FIG. 2, the device controller 30 is connected to the system controller 24, the medium drive 32, the USB module 34, the flash memory 36, the wireless communication module 38, the wired communication module 40, the subsystem 50, the main system 60, and other devices. The device controller 30 absorbs differences in electrical characteristics and data transfer speed among the devices, and controls data transfer timings.

The medium drive 32 is a drive device on which the ROM medium 44 having application software such as games and license information recorded therein is mounted, and the medium drive 32 drives the ROM medium 44 to read programs, data, and the like from the ROM medium 44. The ROM medium 44 may be a read-only recording medium such as an optical disc, a magneto-optical disc, or a Blu-ray disc.

The USB module 34 is a module connected to external equipment via a USB cable. The USB module 34 may be connected to the auxiliary storage apparatus 2 and the camera 7 via USB cables. The flash memory 36 is an auxiliary storage device constituting an internal storage. The wireless communication module 38 makes wireless communication with, for example, the input apparatus 6 according to a communication protocol such as the Bluetooth (registered trademark) protocol or the IEEE (Institute of Electrical and Electronics Engineers) 802.11 protocol. The wired communication module 40 makes wired communication with external equipment and is connected to an external network via the AP 8.

Figure 3:
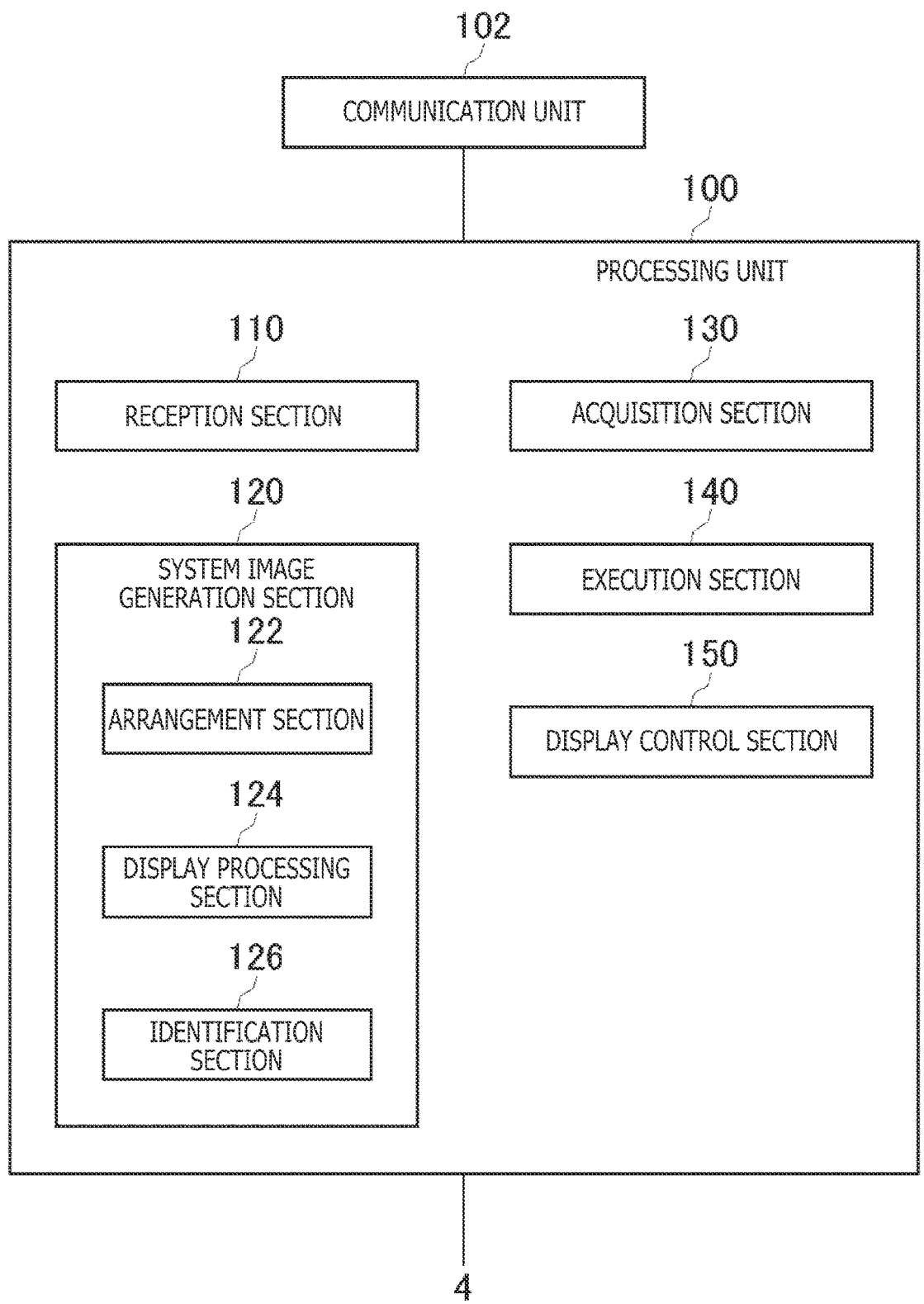
FIG. 3 is a diagram depicting functional blocks of the information processing apparatus.

FIG. 3 depicts a functional block diagram of the information processing apparatus 10. The information processing apparatus 10 includes a processing unit 100 and a communication unit 102, and the processing unit 100 includes a reception section 110, a system image generation section 120, an acquisition section 130, an execution section 140, and a display control section 150.

In FIG. 3, in terms of hardware, elements described as functional blocks performing various processing operations can be configured using circuit blocks, memories, and other LSIs, and in terms of software, the elements are implemented using system software, game programs loaded into the memory, and the like. Accordingly, a person skilled in the art can understand that the functional blocks can be implemented in a variety of forms using only hardware, only software, or a combination of software and hardware, and limitation to any of the forms is not intended.

The communication unit 102 is expressed as a configuration including the functions of both the wireless communication module 38 and the wired communication module 40 depicted in FIG. 2. The communication unit 102 receives operation information provided by the user operating the input section of the input apparatus 6, and the reception section 110 receives the operation information received by the communication unit 102.

The system image generation section 120 has a function of generating a menu image including a plurality of display elements. In the embodiment, the display elements included in the menu image may be GUI elements such as icons in games or icons in applications other than the games. When the user selects a display element from the menu image and performs a determination operation on the selected display element, the execution section 140 executes a function associated with the selected icon. For example, when a game icon is selected and the determination operation is performed on the game icon, the execution section 140 executes a game program associated with the selected icon, to generate a game image and a game sound. At this time, the display control section 150 causes the output apparatus 4 to display the game image generated by the execution section 140.

The system image generation section 120 includes an arrangement section 122, a display processing section 124, and an identification section 126. The arrangement section 122 arranges a plurality of icons on two-dimensional coordinates constituting the screen, to generate a menu image. The arrangement section 122 generates a menu image by using any of various user operations as a trigger. For example, when an on-operation is performed on the main power supply button 20 to activate the information processing apparatus 10, the arrangement section 122 may generate a menu image, and the display control section 150 may display the menu image on the output apparatus 4.

Figure 4:
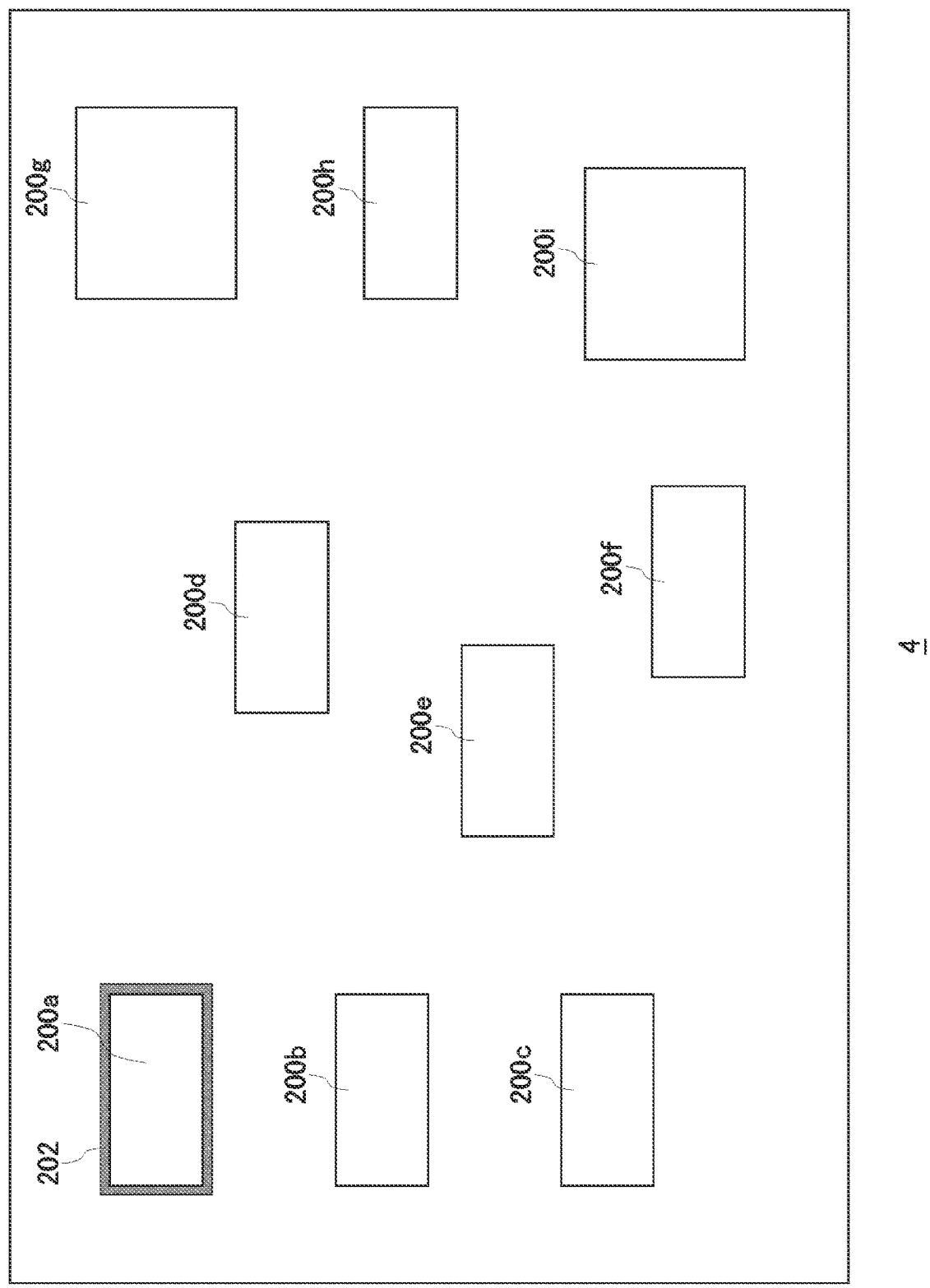
FIG. 4 is a diagram depicting an example of a menu image.

FIG. 4 depicts an example of the menu image. The menu image depicted in FIG. 4 may be an initial image displayed on the output apparatus 4 when the information processing apparatus 10 is activated. The arrangement section 122 generates a menu image in which a plurality of icons 200a, 200b, 200c, 200d, 200e, 200f, 200g, 200h, and 200i (hereinafter referred to as the "icons 200" in a case where the icons are not particularly distinguished from one another) are arranged. The arrangement section 122 may arrange the plurality of icons 200 according to a predetermined layout (format). In the embodiment, the arrangement section 122 arranges the icons 200 corresponding to GUI elements with which functions are associated. However, another type of display elements may be arranged.

The display processing section 124 displays the icon 200 which is in the selected state, in a such manner as to indicate that the icon 200 is selected. In the initial image depicted in FIG. 4, the icon 200a located in an upper left corner of the screen is in the selected state. The display processing section 124 places, around the icon 202a, a focus frame 202 for indicating that the icon is in the selected state. By checking the icon enclosed by the focus frame 202, the user can recognize that the icon 200a is selected. Note that the display processing section 124 may allow the user to recognize that the icon 200a is in the selected state, by displaying the selected icon 200a in such a manner that the icon 200a appears larger than a standard size, or causing the icon 200a to blink, for example, instead of using the focus frame 202.

The input apparatus 6 operated by the user includes direction operators such as arrow keys and/or an analog stick. In the embodiment, when moving the focus frame 202 to select the icon 200, the user operates the direction operators of the input apparatus 6. The direction operators may include four arrow keys allowing the user to specify four directions, that is, up, down, right, and left directions.

With the menu image being displayed on the output apparatus 4, when the user operates any of the direction operators of the input apparatus 6, the reception section 110 receives the operation of the direction operator as an operation of selecting the icon 200. The identification section 126 identifies the moving destination of the focus frame 202, in other words, the selected icon 200, on the basis of the arrow key operated by the user.

FIG. 5 depicts an example of the menu image in which the focus frame 202 has moved. In the menu image depicted in FIG. 5, the focus frame 202 is located around the icon 200g. In the menu image depicted in FIG. 4, when the reception section 110 receives the operation of the right arrow key, the identification section 126 identifies the icon 200g selected by the operation of the right arrow key.

The plurality of icons 200 are arranged by the arrangement section 122 according to a predetermined layout, and the moving destination of the focus frame 202 that is set when the arrow key is operated is defined for each of the positions where the icons 200 are arranged. For example, the moving destination of the focus frame 202 is defined for the upper left corner position where the icon 200a is located, as follows: the focus frame 202 moves to the position of the icon 200g when an operation of the right arrow key is made; and the focus frame 202 moves to the position of the icon 200b when an operation of the down arrow key is made. Note that, for the upper left corner position where the icon 200a is located, it is also defined that the focus frame 202 does not move when an operation of either the left arrow key or the up arrow key is made.

There has been described definition information related to the moving destination that is set when the direction operators are the up, down, right, and left arrow keys. However, in a case where an analog stick is used as the direction operator, the moving destination of the focus frame 202 may be defined by the angular range of the direction in which the analog stick is tilted.

The identification section 126 identifies the position to which the focus frame 202 is to move, according to the definition information regarding the moving destination. In the menu image depicted in FIG. 4, when the reception section 110 receives the operation of the right arrow key, the identification section 126 identifies the icon 200g selected by the operation of the right arrow key, and the display processing section 124 places the focus frame 202 around the icon 200g.

In a case where the plurality of icons 200 are regularly arranged in the vertical direction and the horizontal direction, the user can easily predict the moving destination of the focus frame 202 that is set by operation of the arrow key. For example, when the user operates the right arrow key, the focus frame 202 moves to the position located on the right of the icon. When the user operates the down arrow key, the focus frame 202 moves to the position located immediately below the icon.

On the other hand, as depicted in FIGS. 4 and 5, in a case where the plurality of icons 200 are somewhat irregularly arranged, the user has difficulty in predicting the moving destination of the focus frame 202 that is set by operation of the arrow key. In the embodiment, the right arrow key of the input apparatus 6 is operated to move, to the position of the icon 200g, the focus frame 202 located at the position of the icon 200a. However, in a case where the user assumes that the focus frame 202 is to move to the position of the icon 200d, the user may gaze the icon 200d after operating the right arrow key, and lose sight of the focus frame 202.

Thus, before displaying the focus frame 202 around the icon 200g, the display processing section 124 in the embodiment performs presentation display indicating that the state in which the icon 200a is selected is to be changed to the state in which the icon 200g is selected. In other words, the display processing section 124 inserts, between the display of the menu image depicted in FIG. 4 and the display of the menu image depicted in FIG. 5, a presentation indicating that the selected icon is to be changed. For the sake of explanation, the icon 200a enclosed by the focus frame 202 that is yet to move is referred to as the "first icon 200a," and the icon 200g enclosed by the focus frame 202 that has moved is referred to as the "second icon 200g."

In the state in which the first icon 200a is selected (see FIG. 4), when the reception section 110 receives an operation for selecting the second icon 200g, the identification section 126 determines the moving destination of the focus frame 202 to be the position of the second icon 200g. At this time, the display processing section 124 performs presentation display indicating that the state in which the first icon 200a is selected is to be changed to the state in which the second icon 200g is selected. During the presentation display, the display processing section 124 does not display the focus frame 202.

Figure 6:
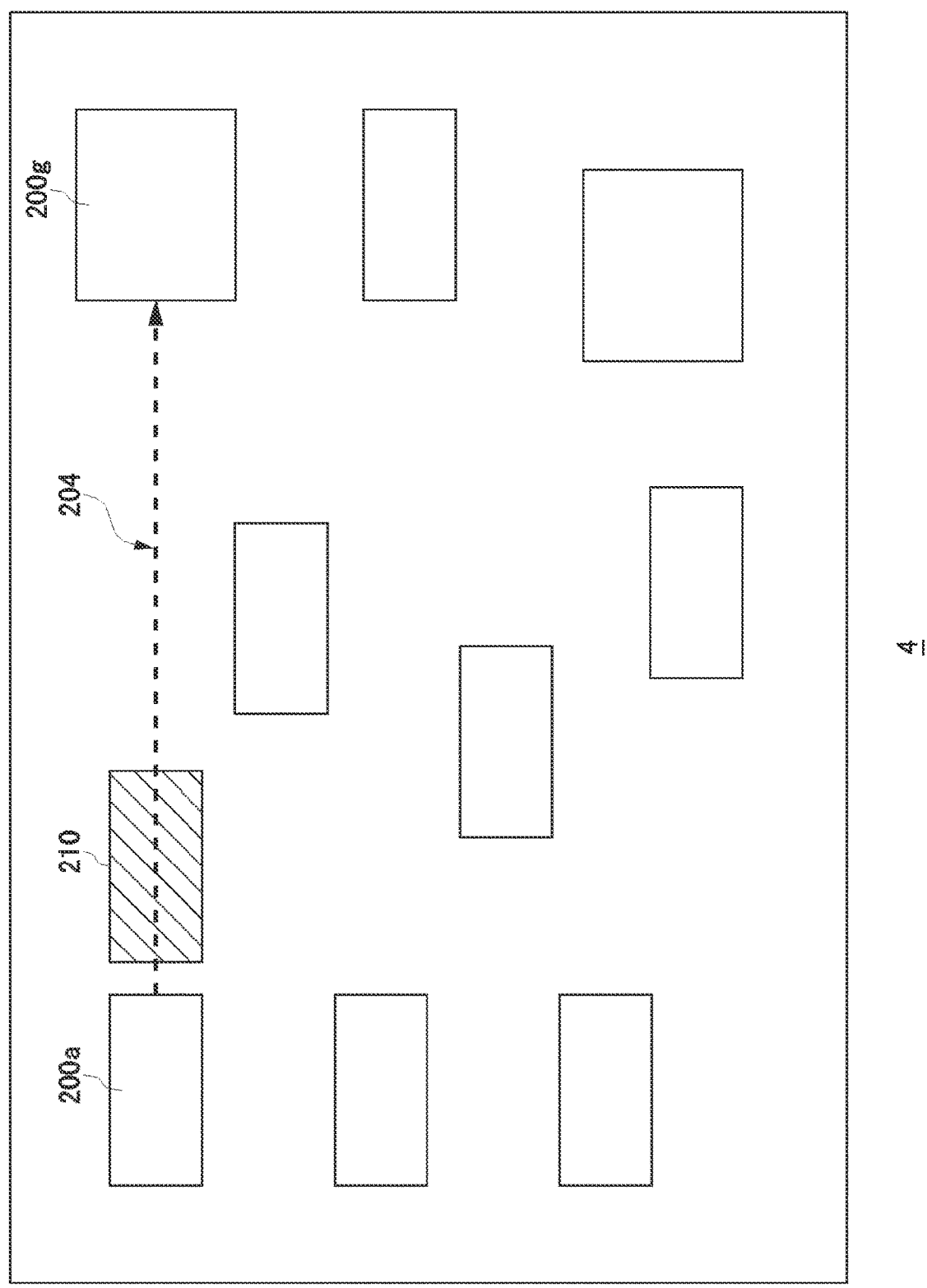
FIG. 6 is a diagram depicting an example of presentation display provided when an icon in a selected state is changed.

FIG. 6 depicts an example of presentation display provided when the icon 200 in the selected state is changed. In FIG. 6, a moving direction 204 indicates a direction heading toward the second icon 200g from the first icon 200a. The moving direction 204 is drawn in FIG. 6 in order to illustrate the moving direction of a presentation element 210; the moving direction 204 is not displayed as a part of the presentation display. Therefore, the user does not visually recognize the moving direction 204. However, the moving direction 204 may be displayed as a part of the presentation display in order to make the moving destination of the presentation element 210 clearer.

The display processing section 124 performs, between the display position of the first icon 200a and the display position of the second icon 200g, the presentation display related to the direction heading toward the display position of the second icon 200g from the display position of the first icon 200a. Specifically, the display processing section 124 performs presentation display for moving the presentation element 210 between the display position of the first icon 200a and the display position of the second icon 200g. The presentation element 210 includes at least a high-luminance region, and the display processing section 124 causes the presentation element 210 to move at high speed in such a manner as to jump out of the first icon 200a and jump into the second icon 200g.

Figure 7:
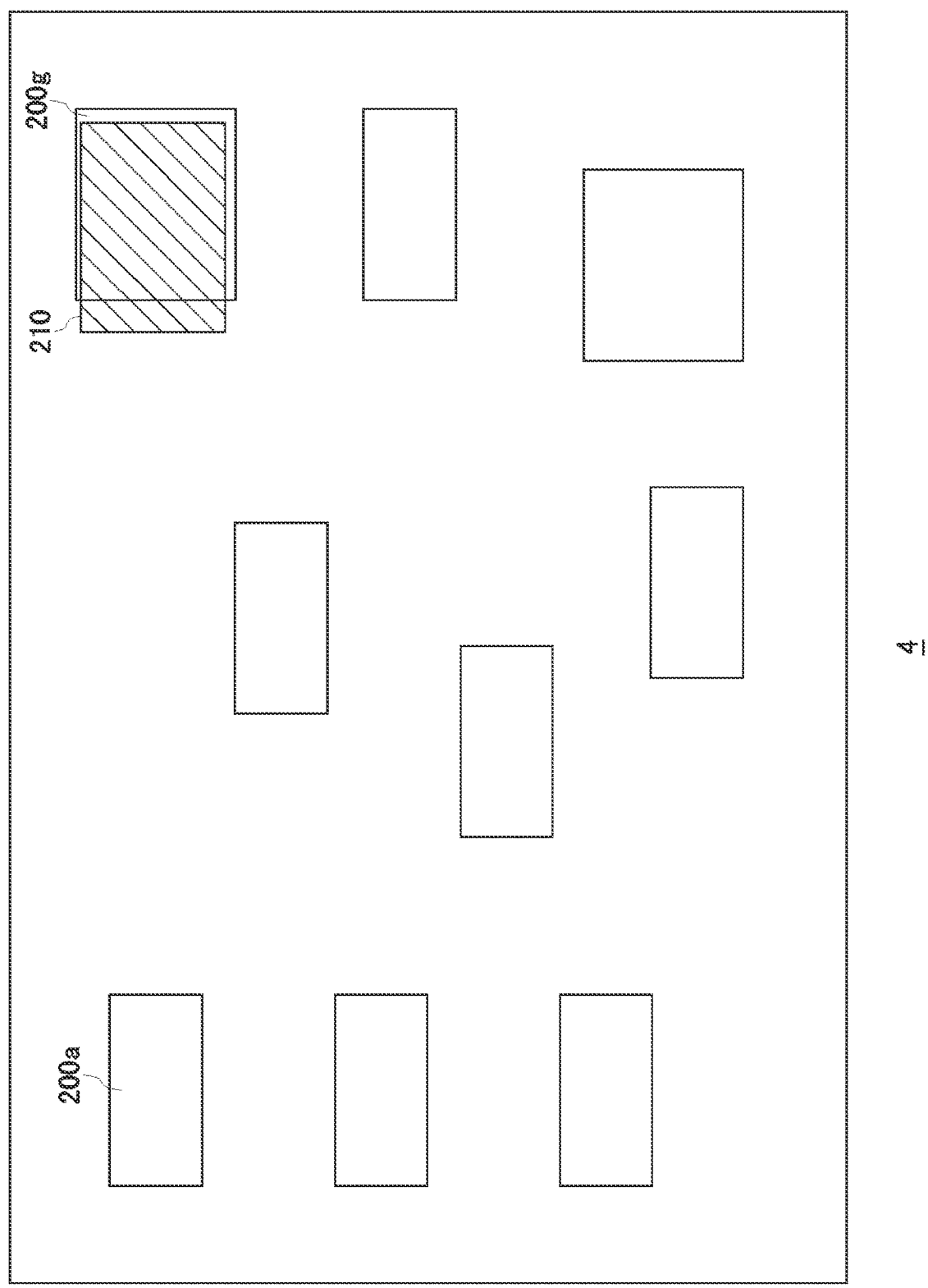
FIG. 7 is a diagram depicting movement of a presentation element.

FIG. 7 depicts how the presentation element 210 jumps into the second icon 200g. Since the presentation element 210 with the high-luminance region moves straight from the first icon 200a toward the second icon 200g, the user can recognize the position of the second icon 200g.

The display processing section 124 changes the shape of the presentation element 210 from the shape of the first icon 200a to the shape of the second icon 200g. When the presentation element 210 jumps out of the first icon 200a, the shape of the presentation element 210 is substantially identical to the shape of the first icon 200a. When the presentation element 210 jumps into the second icon 200g, the shape of the presentation element 210 is substantially identical to the shape of the second icon 200g. It is preferable that the display processing section 124 gradually (continuously or stepwise) deform the presentation element 210 after the presentation element 210 leaves the display position of the first icon 200a but before the presentation element 210 reaches the display position of the second icon 200g.

As depicted in FIGS. 6 and 7, the height of the second icon 200g is longer than the height of the first icon 200a. Thus, when moving the presentation element 210 from the display position of the first icon 200a to the display position of the second icon 200g, the display processing section 124 gradually increases the height of the presentation element 210. When the presentation element 210 is overlaid on the second icon 200g, the display processing section 124 makes the height of the presentation element 210 equal to the height of the second icon 200g. After overlaying the presentation element 210 with the high-luminance region on the second icon 200g, the display processing section 124 displays the focus frame 202 around the second icon 200g.

The presentation element 210 moves from the display position of the first icon 200a to the display position of the second icon 200g, producing a visual effect that makes the user feel that the focus frame 202 is moving. At this time, with the moving presentation element 210 deformed according to the shape of the first icon 200a corresponding to the moving source and the shape of the second icon 200g corresponding to the moving destination, the user can be made to strongly feel the unity of the presentation element 210 and the focus frame 202.

Note that, in the embodiment, the first icon 200a and the second icon 200g each have a rectangular shape but that one of or both the first icon 200a and the second icon 200g may have a shape other than the rectangle, for example, a round shape or a triangular shape. Even in that case, by deforming the moving presentation element 210 from the shape of the first icon 200a corresponding to the moving source to the shape of the second icon 200g corresponding to the moving destination, the display processing section 124 can make the user recognize pseudo movement of the focus frame 202.

The display processing section 124 may determine the moving speed of the presentation element 210 according to the distance between the display position of the first icon 200a and the display position of the second icon 200g. Specifically, the display processing section 124 completes the presentation display in the same predetermined period of time regardless of the distance between the first icon 200a and the second icon 200g. Thus, the moving speed is relatively high as the distance is relatively long, whereas the moving speed is relatively short as the distance is relatively short. Note that the purpose of the presentation display is to make the user recognize the second icon 200g corresponding to the moving destination. Thus, preferably, the moving speed during the presentation display period is set such that the speed of the presentation element 210 moving into the second icon 200g is slower than the speed of the presentation element 210 moving out from the display position of the first icon 200a, so that the user easily recognizes the second icon 200g.

The display processing section 124 performs presentation display such that at least either the first icon 200a or the second icon 200g appears deformed in the moving direction 204. As seen in FIG. 7, when the presentation element 210 with a shape similar to the second icon 200g is overlaid on the second icon 200g, a presentation effect is produced such that the second icon 200g is extended and deformed in the moving direction 204. Such a presentation effect allows the user to easily recognize that the second icon 200g is selected. Note that, after the presentation display, the display processing section 124 places the focus frame 202 around the second icon 200g as depicted in FIG. 5.

The present invention has been described on the basis of the embodiment. The embodiment is illustrative, and a person skilled in the art may understand that a variety of modified examples can be provided by combining components and processes of the embodiment and that such modified examples are also within the scope of the present invention.

A method for displaying images such as thumbnails on the output apparatus 4 will be described below. When the user purchases content such as a game from the content server, the information processing apparatus 10 accesses the content server via the AP 8, and the acquisition section 130 acquires a thumbnail image of the content from the content server. At this time, the content server according to the embodiment first transmits a thumbnail image with a low resolution and then transmits a thumbnail image with a high resolution such that the display control section 150 can promptly display the thumbnail image of the content on the output apparatus 4. The thumbnail image that has the low resolution and is transmitted first is hereinafter referred to as the "first thumbnail image," whereas the thumbnail image that has the high resolution and is subsequently transmitted is hereinafter referred to as the "second thumbnail image." Note that the first thumbnail image may be an image generated by reducing the resolution and the data size of the second thumbnail image.

When the acquisition section 130 acquires the first thumbnail image, the arrangement section 122 places the first thumbnail image at a predetermined position on the two-dimensional coordinates constituting the screen, and the display control section 150 displays the thumbnail image.

Figure 8:
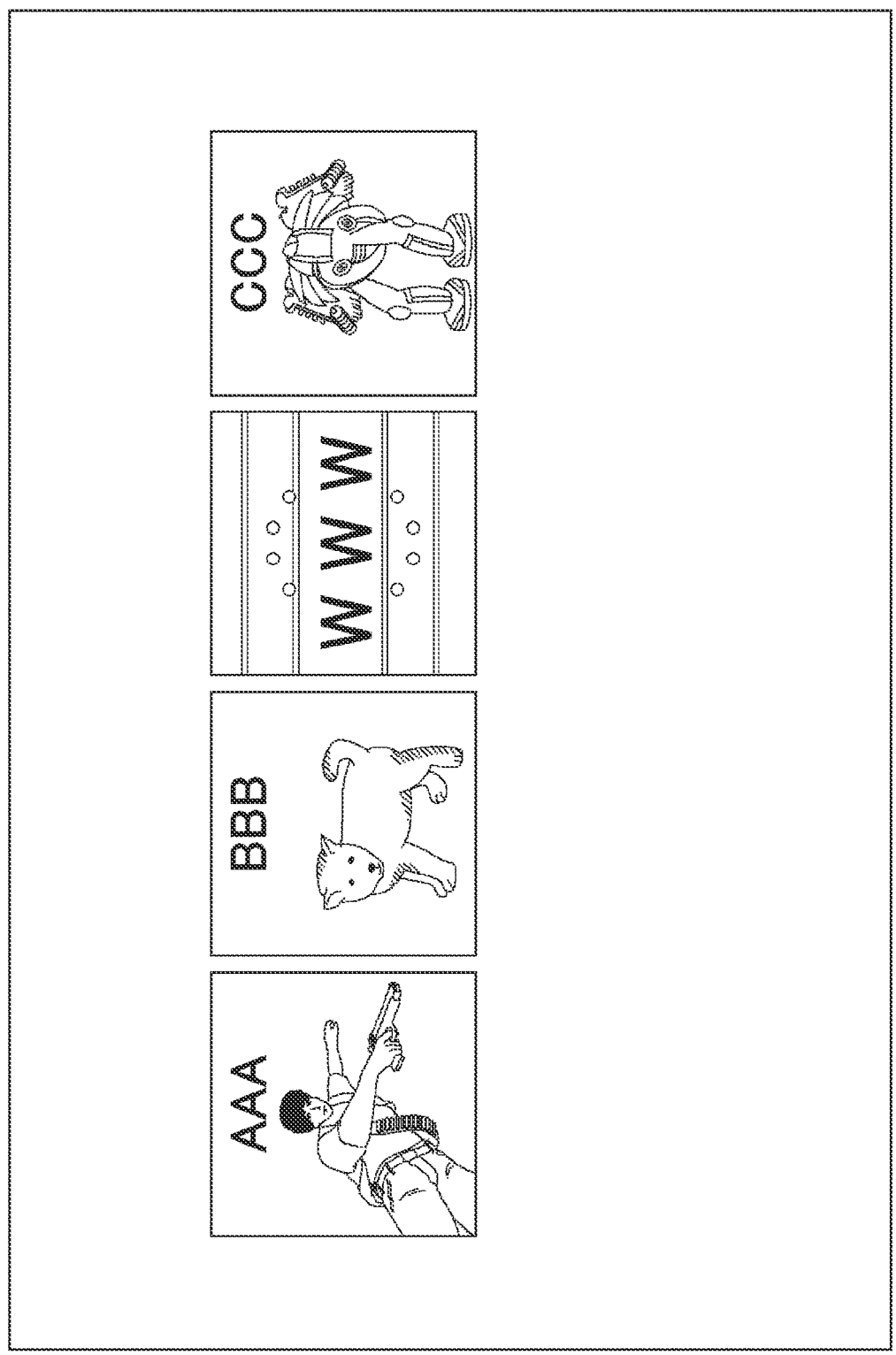
FIG. 8 is a diagram depicting a display example of first thumbnail images.

FIG. 8 depicts a display example of four first thumbnail images. The first thumbnail image displayed in FIG. 8 has a low resolution, and thus, the user recognizes the displayed first thumbnail image as a coarse image. In this case, the purpose of promptly displaying the thumbnail image is achieved, but the coarse image gives a cheap impression and is thus not preferable.

Figure 9:
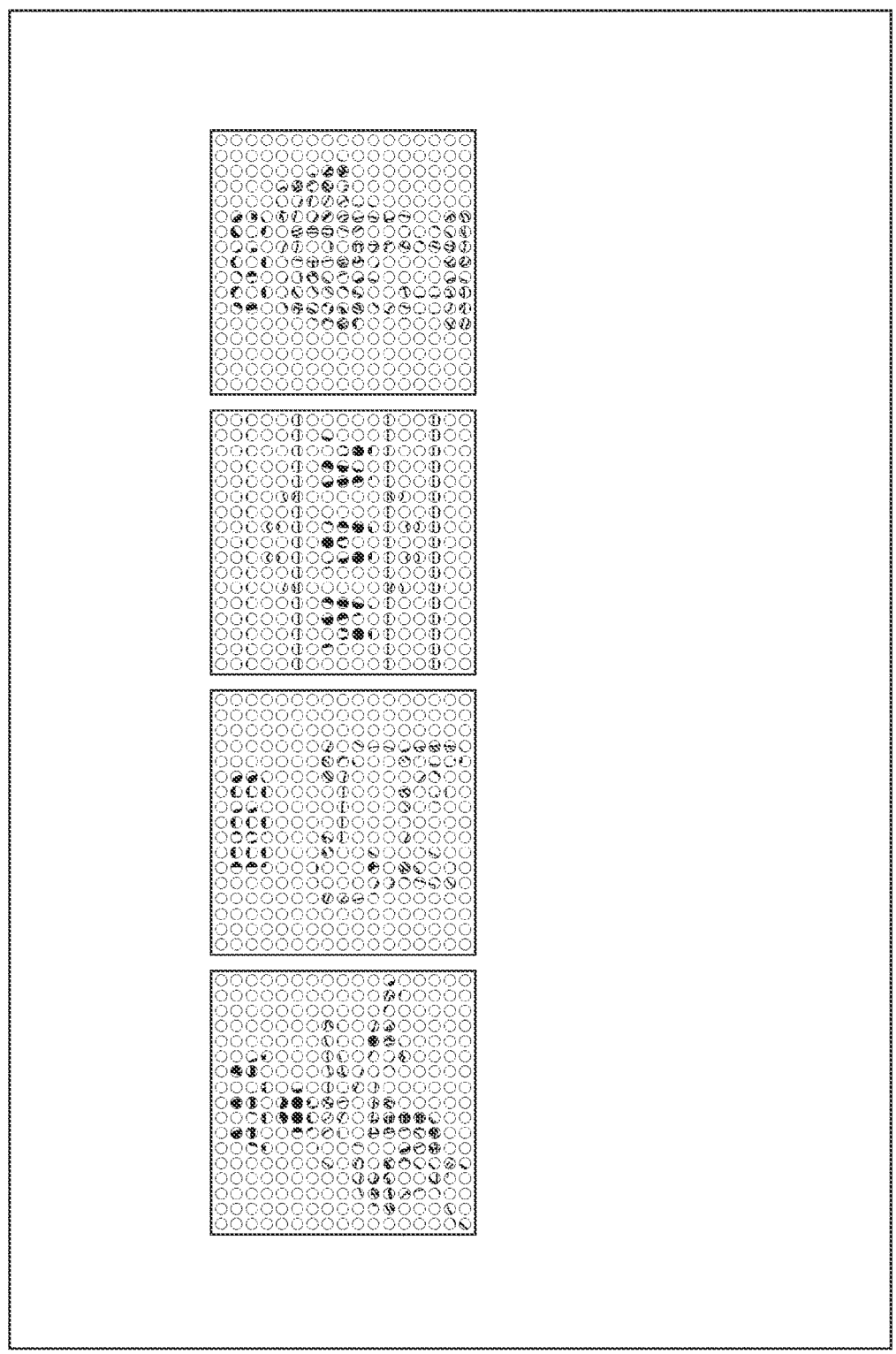
FIG. 9 is a diagram depicting a display example of the first thumbnail images in a modified example.

FIG. 9 depicts a display example of the first thumbnail images in a modified example. The display processing section 124 displays the first thumbnail image partially concealed. In the example in FIG. 9, the display processing section 124 overlays, on the first thumbnail image, a mask with a plurality of scattered openings (holes), so that the first thumbnail image is displayed only through the plurality of openings. For example, when a mask that includes twenty or more openings arranged at substantially regular intervals in the vertical direction and twenty or more openings arranged at substantially regular intervals in the horizontal direction is overlayed on a single first thumbnail image, the user can recognize a blurred outline of the thumbnail image. Thus, in the modified example, instead of directly displaying the entire coarse image as depicted in FIG. 8, only a part of the coarse image is displayed to prevent the user from noticing the coarseness of the image.

When the acquisition section 130 acquires the second thumbnail image from the content server while the display control section 150 displays the first thumbnail image partially concealed, the arrangement section 122 places, on the two-dimensional coordinates constituting the screen, the second thumbnail image instead of the first thumbnail image and the mask. Thus, the display control section 150 displays the second thumbnail image instead of the first thumbnail image that is partially concealed and displayed. The above-described processing enables the information processing apparatus 10 to display the entire second thumbnail image with the high resolution after promptly displaying only a part of the first thumbnail image with the low resolution.

An outline of the above-described modified example is as follows.

An image display method in the modified example includes:
- a step of acquiring a first image with a low resolution;
- a step of partially concealing the acquired first image and displaying the first image;
- a step of acquiring a second image with a high resolution; and
- a step of displaying the second image instead of the first image.

INDUSTRIAL APPLICABILITY

The present invention can be utilized in a technical field in which a plurality of display elements are displayed on a screen.

REFERENCE SIGNS LIST

1: Information processing system
10: Information processing apparatus
100: Processing unit
102: Communication unit
110: Reception section
120: System image generation section
122: Arrangement section
124: Display processing section
126: Identification section
130: Acquisition section
140: Execution section
150: Display control section

The invention claimed is:

1. An image processing apparatus with processor enabled sections comprising:
   an arrangement section that arranges a plurality of display elements including a first display element and a second display element;
   a reception section that receives an operation from a user for selecting among the plurality of display elements; and
   a display processing section that displays a selected display element among the plurality of display elements in such a predetermined manner as to indicate that the display element is selected, wherein:
   when the reception section receives an operation for selecting the second display element while the first display element is displayed in the predetermined manner in the selected state, the display processing section performs presentation display indicating that the selected state in which the first display element is selected is to be changed such that the second display element is selected,
   the presentation display includes removing the display of the first display element in the predetermined manner, newly presenting a presentation display element between the first display element and the second display element, moving the presentation display element from near the first display element to the second display element based on a moving speed of the presentation element according to a distance between the display position of the first display element and the display position of the second display element, and such that the presentation display element jumps from the first display element to the second display element,
   then the display processing section displays the second display element in the predetermined manner,
   the display processing section performs presentation display in which a presentation element is moved between a display position of the first display element and a display position of the second display element, and
   the display processing section changes a shape of the presentation element from a shape of the first display element to a shape of the second display element, and wherein the shape of the first display element is different than the shape of the second display element.

2. The image processing apparatus according to claim 1, wherein the display processing section performs, between the first display element and the second display element, presentation display related to a direction heading toward the second display element from the first display element, and then displays the second display element in the predetermined manner.

3. The image processing apparatus according to claim 2, wherein the display processing section performs presentation display in which at least either the first display element or the second display element appears deformed in the direction.

4. The image processing apparatus according to claim 1, wherein the display processing section determines a moving speed of the presentation element according to a distance between the display position of the first display element and the display position of the second display element.

5. An image processing method comprising:
arranging a plurality of display elements including a first display element and a second display element;
receiving an operation from a user for selecting among the plurality of display elements; displaying a selected display element among the plurality of display elements in such a predetermined manner as to indicate that the display element is selected;
performing, when the receiving includes receiving an operation for selecting the second display element while the first display element is displayed in the predetermined manner in the selected state, presentation display indicating that the selected state in which the first display element is selected is to be changed such that the second display element is selected;
the performing presentation display includes removing the display of the first display element in the predetermined manner, newly presenting a presentation display element between the first display element and the second display element, moving the presentation display element from near the first display element to the second display element based on a moving speed of the presentation element according to a distance between the display position of the first display element and the display position of the second display element, and such that the presentation display element jumps from the first display element to the second display element;
displaying the selected second display element in the predetermined manner;
performing a presentation display process in which a presentation element is moved between a display position of the first display element and a display position of the second display element; and
the presentation display process includes changing a shape of the presentation element from a shape of the first display element to a shape of the second display element, and wherein the shape of the first display element is different than the shape of the second display element.

6. A non-transitory, computer readable storage medium containing a computer program, which when executed by a computer, causes the computer to perform an image processing method by carrying out actions, comprising:
arranging a plurality of display elements including a first display element and a second display element;
receiving an operation from a user for selecting among the plurality of display elements; displaying a selected display element among the plurality of display elements in such a predetermined manner as to indicate that the display element is selected;
performing, when the receiving includes receiving an operation for selecting the second display element while the first display element is displayed in the predetermined manner in the selected state, presentation display indicating that the selected state in which the first display element is selected is to be changed such that the second display element is selected;
the performing presentation display includes removing the display of the first display element in the predetermined manner, newly presenting a presentation display element between the first display element and the second display element, moving the presentation display element from near the first display element to the second display element based on a moving speed of the presentation element according to a distance between the display position of the first display element and the display position of the second display element, and such that the presentation display element jumps from the first display element to the second display element;
displaying the selected second display element in the predetermined manner;
performing a presentation display process in which a presentation element is moved between a display position of the first display element and a display position of the second display element; and
the presentation display process includes changing a shape of the presentation element from a shape of the first display element to a shape of the second display element, and wherein the shape of the first display element is different than the shape of the second display element.

* * * * *